(12) United States Patent
Kressin et al.

(10) Patent No.: US 7,080,778 B1
(45) Date of Patent: Jul. 25, 2006

(54) MOVEABLE OBJECT ACCOUNTABILITY SYSTEM

(75) Inventors: Robert Kressin, Gaithersburg, MD (US); Denise Schoeneich, Irvine, CA (US); Kenneth Stott, Damascus, MD (US); Donald Lecher, Potomac, MD (US)

(73) Assignee: Advermotion, Inc., Gaithersburg, MD (US)

( * ) Notice: Subject to any disclaimer, the term of this patent is extended or adjusted under 35 U.S.C. 154(b) by 0 days.

(21) Appl. No.: 10/898,193

(22) Filed: Jul. 26, 2004

(51) Int. Cl.
G06F 19/00 (2006.01)
G06Q 30/00 (2006.01)
G06Q 90/00 (2006.01)

(52) U.S. Cl. .................. 235/385; 705/22
(58) Field of Classification Search ........... 235/385; 705/22
See application file for complete search history.

(56) References Cited

U.S. PATENT DOCUMENTS

| | | | |
|---|---|---|---|
| 4,603,390 A | 7/1986 | Mehdipour et al. | |
| 4,774,571 A | 9/1988 | Mehdipour et al. | |
| 5,034,739 A | 7/1991 | Gruhl | |
| 5,101,200 A | 3/1992 | Swett | |
| 5,245,329 A * | 9/1993 | Gokcebay | 340/5.33 |
| 5,351,187 A | 9/1994 | Hassett | |
| 5,359,528 A | 10/1994 | Haendel et al. | |
| 5,414,624 A | 5/1995 | Anthonyson | |
| 5,422,473 A * | 6/1995 | Kamata | 235/384 |
| 5,432,904 A | 7/1995 | Wong | |
| 5,602,919 A | 2/1997 | Hurta et al. | |
| 5,745,036 A | 4/1998 | Clare | |
| 5,801,618 A | 9/1998 | Jenkins | |
| 5,969,641 A | 10/1999 | Nakamura et al. | |
| 6,081,206 A | 6/2000 | Kielland | |
| 6,226,622 B1 | 5/2001 | Dabbiere | |
| 6,243,029 B1 | 6/2001 | Tomer | |
| 6,246,861 B1 | 6/2001 | Messier et al. | |
| 6,366,220 B1 | 4/2002 | Elliott | |
| 6,390,151 B1 | 5/2002 | Christman et al. | |
| RE37,822 E | 8/2002 | Anthonyson | |
| 6,446,865 B1 * | 9/2002 | Holt et al. | 235/382 |
| 6,459,987 B1 | 10/2002 | Krull et al. | |
| 6,538,580 B1 | 3/2003 | Bostrom et al. | |
| 6,545,606 B1 | 4/2003 | Piri et al. | |
| 6,609,090 B1 | 8/2003 | Hickman et al. | |
| 6,611,757 B1 | 8/2003 | Brodie | |
| 6,701,239 B1 | 3/2004 | Keefer | |
| 6,702,351 B1 | 3/2004 | Buring et al. | |
| 6,792,395 B1 | 9/2004 | Roberts | |
| 2004/0211883 A1 * | 10/2004 | Imagawa et al. | 250/280.1 |

* cited by examiner

*Primary Examiner*—Uyen-Chau N. Le
(74) *Attorney, Agent, or Firm*—Katten Muchin Rosenman LLP

(57) ABSTRACT

An accountability system for monitoring the status of a certain condition of a moveable object having an electronic identification device with a transmittable unique identification code is disclosed. A verification station with an electronic signal transmission and reception device remotely initiates communication with the electronic identification device on the moveable object and receives the unique identification code. A database at the verification station retrieves information related to the unique identification code, and a camera captures a digital image of the moveable object, while displaying the image and querying a user to input verification data to an input device. A data processing sub-system at the verification station verifies the user's input and compiles a data record of the unique identification code, the digital image, and data input from the user into a data record and stores the compiled record in memory for later communication with a remote storage device.

48 Claims, 5 Drawing Sheets

MOVEABLE OBJECT ACCOUNTABILITY SYSTEM

FIELD OF INVENTION

The general field of the invention relates to periodic and real-time location history tracking with periodic verification of the existence or non-existence of certain predetermined conditions of moveable objects within a time period.

This invention relates to an accountability system for monitoring the status of a certain condition of a moveable object having an electronic identification device with a transmittable unique identification code. A verification station with an electronic signal transmission and reception device remotely initiates communication with the electronic identification device on the moveable object and receives the unique identification code. A database at the verification station retrieves information related to said unique identification code, and a camera captures a digital image of said moveable object while displaying the image and querying a user to input verification data to an input device. A data processing system at the verification station verifies the user's input and compiles a data record of the unique identification code, the digital image, and data input from the user into a data record and stores the compiled record in memory for later communication with a remote storage device.

BACKGROUND OF INVENTION

The requirement for an accountability system for verifying and monitoring a predetermined condition on a moveable object in addition to collecting data of the location of that moveable object in a low cost and technically simple manner has long existed. One example of moveable objects could be commercial, non-commercial or fleet owned vehicles having a condition such as a displayable sign or advertisement. This invention allows an entity, such as an advertising client, to account for any such displayable sign or advertisement on any particular moveable object over a period of time, and additionally obtain data on general or specific movement of that particular moveable object over a period of time or with real-time data acquisition.

The objective of this invention relates to the use of an accountability system for verifying a condition on a moveable object through the use of a hardware sub-system on the moveable object containing a unique identification code. A verification sub-system remote from the moveable object identifies the presence of the moveable object by the unique identification code and collects information regarding the condition of the moveable object for transmission to a central data processing system remote from either previous sub-system. The transmitted verification data is then processed at the central data processing system which controls communication of the processed information and other information transmitted to clients, vendors, suppliers, retailers, point of sale devices, and owner/operators of the moveable objects subject to the accountability system's verification process.

Although other systems use location logging or tracking devices, no other system meets the objectives of verifying a condition on a moveable object in addition to logging or transmitting date, time and location coordinate data.

SUMMARY OF THE INVENTION

A specific sub-system of a first embodiment of this invention comprises a moveable object accountability system that monitors the status of at least one condition of a moveable object. The condition is one of a visible indication of distinguishing characteristics of the moveable object, a visible licensing indicator of the moveable object, and a graphical representation on the moveable object.

The moveable accountability system comprises an electronic identification device mounted on the moveable object, wherein the electronic identification device has a unique identification code and electronically transmits a signal containing information of the unique identification code. An electronic signal transmission and reception device initiates communication with the electronic identification device and receives the signal continuing information of the unique identification code from the electronic identification device mounted on the moveable object. A local database has stored information related to at least one of the unique identification code, the moveable object and the at least one condition of the moveable object. A camera captures a first image of the moveable object, wherein the first image includes a representation of the at least one condition of the moveable object. A display device displays information contained in the first image, and displays a query or information including or related to the unique identification code. An input device allows the inputting of data related to the moveable object or inputting a response to the query displayed at the display device. A data processing sub-system coupled to the electronic signal transmission and reception device, the local database, the camera, the display device and the input device, the data processing sub-system: 1) compares the signal containing information of the unique identification code with related information in the local database; 2) displays, at the display device, graphical information contained in the first image and a query to validate information related to the moveable object and the unique identification code: and 3) compares input data received from the input device in response to the query to data stored in the local database. The data processing sub-system compiles data received from the unique identification code received from the electronic signal transmission and reception device, the camera, and the input device into a data record, and a memory location within the local database stores the data record. Finally, a communication link between the local database and a remote storage device transmits at least one stored data record to the remote storage device.

The electronic identification device in the above sub-system embodiment may comprise a radio frequency identification device, and the system may include an output device for outputting information related to the moveable object, wherein the output device may comprise a coupon printer device.

A method of collecting accountability data for a moveable object in the first embodiment of the invention comprises the steps of: determining the presence of an electronic identification device; querying the electronic identification device to output a unique identification code; receiving the output unique identification code; comparing the received unique identification code with information related to the received unique identification code in a local database; capturing a digital image of a moveable object including a representation of at least one condition, wherein the at least one condition comprises one of a visible indication of distinguishing characteristics of the moveable object, a visible licensing indicator of the moveable object, and a graphical representation on the moveable object; displaying at a display device the representation of the at least one condition of the moveable object from the step of capturing and a verification query based on the step of comparing; receiving input based on the step of displaying; comparing the received input with related data stored in the local database; assembling a data record comprising information contained in the unique identification code, the captured digital image of the moveable object including a representation of at least one condition, and the received input, based on the step of comparing; storing the assembled data record in a local database; and transmitting the stored data record to a remote database A specific apparatus of the first embodiment of the invention comprises an electronic signal transmission and reception device that initiates communication with a remote electronic identification device and receives a signal containing information of a unique identification code from the remote electronic identification device mounted on a moveable object. A local database stores information related to at least one of the unique identification code, the moveable object and information of at least one condition of the moveable object. A camera captures a first image of the moveable object, wherein the first image includes a representation of the at least one condition of the moveable object, the at least one condition comprising one of a visible indication of distinguishing characteristics of the moveable object, a visible licensing indicator of the moveable object, and a graphical representation on the moveable object. A display device displays information contained in the first image, and displays a query or information including or related to the unique identification code. An input device allows the input of data related to the moveable object or a response to the query displayed at the display device. A data processor is coupled to the electronic signal transmission and reception device, the local database, the camera, the display device and the input device, and a memory within the local database stores a data record compiled by the data processor from information received from the electronic signal transmission and reception device, the camera, and the input device. Finally, a communication link between the local database and a remote storage device transmits at least one stored data record to the remote storage device.

The remote electronic identification device of the above specific embodiment may comprise of a radio frequency identification device, and the apparatus may further comprises an output device for outputting information related to the unique identification code, wherein the output device comprises a coupon printer device for printing coupons related to the unique identification code.

A general system of the first embodiment of the moveable object accountability system monitors the status of at least one condition of a moveable object, wherein the at least one condition comprises one of a visible indication of distinguishing characteristics of the moveable object, a visible licensing indicator of the moveable object, and a graphical representation on the moveable object. The moveable accountability system comprises an electronic identification device mounted on the moveable object, wherein the electronic identification device has a unique identification code and the device is able to electronically transmit a signal containing information of the unique identification code. An electronic signal transmission and reception device initiates communication with the electronic identification device and receives the signal containing information of the unique identification code from the electronic identification device mounted on the moveable object. A local database stores information related to at least one of the unique identification code, the moveable object and the at least one condition of the moveable object. A camera captures a first image of the moveable object, wherein the first image includes a representation of the at least one condition of the moveable object. A display device displays graphical information contained in the first image, and displays a query or information including or related to the unique identification code. An input device allows inputting of data related to the moveable object or responses to the query regarding information displayed at the display device. A data processing sub-system coupled to the electronic signal transmission and reception device, the local database, the camera, the display device and the input device, compares the signal containing information of the unique identification code with related information in the local database displays, at the display device, graphical information contained in the first image and a query to validate information related to the moveable object and the unique identification code, and compares input data received from the input device in response to the query to data stored in the local database. The data processing sub-system compiles data received from the unique identification code received from the electronic signal transmission and reception device, the camera, and the input device into a data record, and a memory within the data processing sub-system stores the data record. A remote central processing data system having a central storage database is connected via a communication link between the local database to transmit information between the remote central data processing system and the local database for processing the at least one stored data record at the remote central processing data system.

The electronic identification device of the above general embodiment comprises a radio frequency identification device, and the system further comprises an output device for outputting information related to the unique identification code, wherein the output device may comprises a coupon printer device for printing coupons related to the unique identification code.

A first specific apparatus of a second embodiment of this invention comprises a data logging apparatus for use with a moveable object accountability system having a unique identification code specific only to the apparatus, a date and clock signal generator for outputting current date and clock data, a location identification device for determining the geographic location of the apparatus and outputting corresponding location data, a motion detection sensor for detecting when the apparatus is in motion, and a central processing unit for data logging activated when the motion detection sensor detects motion. The data logging function assembles data from the unique identification code, the date and clock data, and the location data at predetermined period time intervals and a memory stores the assembled data from the central processor. A transmitter and receiver for transmits and receives data between the apparatus and a moveable object accountability system, wherein the transmitted data comprises at least one of the unique identification code, and the stored assembled data. Additionally included is a power source for supplying power to the apparatus.

The location identification device of the above first specific apparatus comprises one of a global positioning system (GPS) output device, a cellular telephone location system device, and an accelerometer or inertial positioning device, and the unique identification code and the transmitter and receiver comprises a radio frequency identification device.

A first specific sub-system of a second embodiment of this invention comprises a data logging system for logging the position of a moveable object, wherein the data logging system comprises a motion detection sensor outputting a signal when motion is detected of the data logging system, a location identification signal generator determining the geographic coordinates of the data logging system and outputting geographic coordinates as location data, a date and clock signal generator outputting current date and time data, and a unique identification code specific to and stored in the data logging system. A data processing sub-system is coupled to the outputs of the motion detection sensor, the location identification sensor, the date and clock signal generator, and the unique identification code, wherein the data processing sub-system determines a motion detected signal from the motion detector sensor output, and thereby retrieves: 1) the unique identification code of the data logging system; 2) the location data from the location identification signal generator output; and 3) the current date and time data from the data and clock signal generator. The data processing central processor assembles the retrieved data into a single data record, stores the data record into a next available memory register. A transmitter and receiver transmits the contents of the memory register including the stored data record from the data logging system to a remote storage device.

The location identification signal generator of the first specific sub-system above, comprises one of a global positioning system (GPS) output device, a cellular telephone location system device, and an accelerometer or inertial positioning device.

A second specific apparatus of a second embodiment of this invention comprises an electronic signal transmission and reception device for initiating communication with a remote electronic identification and data logging device mounted on a moveable object, the apparatus receives a signal containing information of a unique identification code, and receives assembled and stored data comprising assembled information of the unique identification code, location coordinate data, and corresponding date and time data from the remote electronic identification and data logging device. A local database has stored information related to the unique identification code, the moveable object and information of at least one condition of the moveable object. A camera captures a first image of the moveable object, wherein the first image includes representation of the at least one condition of the moveable object comprising one of a visible indication of distinguishing characteristics of the moveable object, a visible licensing indicator of the moveable object, and a graphical representation on the moveable object. A display device displays graphical information contained in the first image, and displays a query or information including or related to the unique identification code. An input device allows input of data related to the moveable object or responses to the query regarding information displayed at the display device. A data processor coupled to the electronic signal transmission and reception device, the local database, the camera, the display device and the input device, includes a memory that stores a data record compiled by the data processor from information received from the electronic signal transmission and reception device, the camera, and the input device. A communication link between the local database and a remote storage device transmits at least one stored data record to the remote storage device.

The remote electronic identification and data logging device of the second specific apparatus above comprises a radio frequency identification device, and further comprises an output device for outputting information related to the unique identification code, wherein the output device comprises a coupon printer device for printing coupons related to the unique identification code.

A second specific sub-system of a second embodiment of this invention comprises a moveable object accountability system for monitoring the status of at least one condition of a moveable object, wherein the at least one condition comprises one of a visible indication of distinguishing characteristics of the moveable object, a visible licensing indicator of the moveable object, and a graphical representation on the moveable object. The moveable accountability system comprises of an electronic identification and data logging device mounted on the moveable object, wherein the electronic identification and data logging device has a unique identification code and stored data comprising assembled information of the unique identification code, location coordinate data, and corresponding date and time data. The electronic identification and data logging device has a transmitter that transmits a signal containing information of the unique identification code and the stored data. An electronic signal transmission and reception device initiates communication with the electronic identification and data logging device and receives the unique identification code and the stored data from the electronic identification and data logging device mounted on the moveable object. A local database stores information related to at least one of the unique identification code, the moveable object and the at least one condition of the moveable object. A camera captures a first image of the moveable object, wherein the first image includes a representation of the at least one condition of the moveable object. A display device displays graphical information contained in the first image, and displays a query or information including or related to the unique identification code. An input device allows for inputting of data related to the moveable object or responses to the query regarding information displayed at the display device. A data processing sub-system coupled to the electronic signal transmission and reception device, the local database, the camera, the display device and the input device, wherein the data processing sub-system compares the signal containing information of the unique identification code with related information in the local database, displays, at the display device, graphical information contained in the first image and a query to validate information related to the moveable object and the unique identification code. The data processing sub-system compiles information received from the electronic signal transmission and reception device, from the camera, and from the input device into a data record, and a memory within the local database of the data processing sub-system stores the data record. A communication link between the local database and a remote database transmits the information comprising the data record between the local database and the remote database.

A first method of collecting data on the position of a moveable object having a data logging device in the second embodiment of this invention, wherein the data logging device has a unique identifier address datum, a location identification output device, and a date and clock signal output generator. The method comprising the steps of: a. determining movement of the data logging device; b. powering on the data logging device from a data logging power standby mode if in the power standby mode based on the step of determining movement of the data logging device; c. retrieving the unique identifier address datum, a position datum from the location identification device, and current date and time data from the date and clock signal generator; d. storing date and time data in a date and clock memory register; e. assembling the unique identifier address datum, a position datum from the location identification device, and current date and time data from the date and clock signal generator into data record from the step of retrieving; f. storing the data record in a memory in the data logging device; g. determining when the data and clock signal output equals the sum of a first specified period of time and the stored date and time data in the data and clock memory register; h. determining movement of the data logging device within a second specified period of time; 1. repeating the steps c. to g. when step h. determines movement within the second specified period of time; 2. repeating steps d. to g. when step h. determines no movement within the second specified period of time and when date/clock output is less than the sum of a third specified period of time and the stored clock register data; 3. powering down the data logging device to standby power when step h. determines no movement within the second specified period of time and when date/clock output is equal to or greater than the sum of a third specified period of time and the stored clock register data.

The location identification output device identified in the first method above, comprises one of a global positioning system (GPS) output device, a cellular telephone location system device, and an accelerometer or inertial positioning device.

A second method of collecting accountability data for a moveable object in the second embodiment of this invention comprising the steps of: determining the presence of an electronic identification and data logging device; querying the electronic identification and data logging device to output a unique identification code; receiving the output unique identification code; comparing the received unique identification code with information related to the received unique identification code in a local database; querying, based on the step of comparing, the electronic identification and data logging device to transmit stored data comprising assembled information of the unique identification code, location coordinate data, and corresponding date and time data; receiving the stored data comprising assembled information of the unique identification code, location coordinate data, and corresponding date and time data from the electronic identification and data logging device based on the previous step of querying; capturing a digital image of a moveable object including a representation of at least one condition, wherein the at least one condition comprises one of a visible indication of distinguishing characteristics of the moveable object, a visible licensing indicator of the moveable object, and a graphical representation on the moveable object; displaying at a display device the representation of at least one condition of the moveable object from the step of capturing and a verification query based on the step of comparing; receiving input based on the step of displaying; comparing the received input with related data stored in the local database; assembling a data record comprising information contained in the unique identification code, the received stored data comprising assembled information of the unique identification code, location coordinate data, and corresponding date and time data, the captured image of the moveable object including a representation of at least one condition, and the received input, based on the step of comparing; storing the assembled data record in a local database; and transmitting the stored data record to a remote database.

A general system of the second and preferred embodiment of the moveable object accountability system for monitoring the status of at least one condition of a moveable object, wherein the at least one condition comprises one of a visible indication of distinguishing characteristics of the moveable object, a visible licensing indicator of the moveable object, and a graphical representation on the moveable object, the moveable accountability system comprising: an electronic identification and data logging device mounted on the moveable object, wherein the electronic identification and data logging device has a unique identification code and stored data comprising assembled information of the unique identification code, location coordinate data, and corresponding date and time data, the electronic identification and data logging device having a transmitter for transmitting a signal containing information of the unique identification code and the stored data; an electronic signal transmission and reception device for initiating communication with the electronic identification and data logging device and receiving the unique identification code and the stored data from the electronic identification and data logging device mounted on the moveable object; a local database having stored information related to at least one of the unique identification code, the moveable object and the at least one condition of the moveable object; a camera capturing a first image of the moveable object at a first observation time, wherein the first image captures a graphical representation of the at least one condition of the moveable object; a display device for displaying graphical information contained in the first image, and displaying a query or information including or related to the unique identification code; an input device for inputting data related to the moveable object or responses to the query regarding information displayed at the display device; a data processing sub-system coupled to the electronic signal transmission and reception device, the local database, the camera, the display device and the input device, the data processing sub-system comparing the signal containing information of the unique identification code with related information in the local database, displaying, at the display device, graphical information contained in the first image and a query to validate information related to the moveable object and the unique identification code; means, within the data processing sub-system for compiling information received from the electronic signal transmission and reception device, from the camera, and from the input device into a data record; a memory within the data processing sub-system for storing the data record; a remote central processing data system having a central storage database; a communication link between the local database and the remote central data processing system for transmitting information between the remote central data processing system and the local database; and means for processing the at least one stored data record at the remote central processing data system.

An alternative general system of the second embodiment of the moveable object accountability system monitors the status of at least one condition of a moveable object, wherein the at least one condition comprises one of a visible indication of distinguishing characteristics of the moveable object, a visible licensing indicator of the moveable object, and a graphical representation on the moveable object, the moveable accountability system comprising: an electronic identification and data transmission device mounted on the moveable object, wherein the electronic identification and data transmission device has a transmitter for transmitting a unique identification code, and for transmitting corresponding data comprising assembled information of the unique identification code, location coordinate data, and corresponding date and time data to a remote central processing data system having a central storage database; an electronic signal transmission and reception device for initiating communication with the electronic identification and data transmission device and receiving the unique identification code from the electronic identification and data transmission device mounted on the moveable object; a local database having stored information related to at least one of the unique identification code, the moveable object and the at least one condition of the moveable object; a camera capturing a first image of the moveable object at a first observation time, wherein the first image captures a graphical representation of the at least one condition of the moveable object; a display device for displaying graphical information contained in the first image, and displaying a query or information including or related to the unique identification code; an input device for inputting data related to the moveable object or responses to the query regarding information displayed at the display device; a data processing sub-system coupled to the electronic signal transmission and reception device, the local database, the camera, the display device and the input device, the data processing sub-system comparing the signal containing information of the unique identification code with related information in the local database, displaying, at the display device, graphical information contained in the first image and a query to validate information related to the moveable object and the unique identification code; means, within the data processing sub-system for compiling information received from the electronic signal transmission and reception device, from the camera, and from the input device into a data record; a memory location within the local database of the data processing sub-system for storing the data record; a communication link between the local database and the remote central data processing system for transmitting information between the remote central data processing system and the local database; and means for correlating the at least one stored data record at the remote central processing data system to the transmitted corresponding data comprising the assembled information of the unique identification code, location coordinate data, and corresponding date and time data stored at a previous time in the remote central data processing system; and means for processing the at least one stored data record and the transmitted corresponding data.

The electronic identification and data logging device of the second sub-system and the general system of the second embodiment, and the electronic identification and data transmission device of the alternative general system of the second embodiment above, comprises: a unique identification code specific only to the apparatus; a date and clock signal generator for outputting current date and clock data; a location identification device for determining the geographic location of the apparatus and outputting corresponding location data, the location identification device comprises one of a global positioning system (GPS) output device, a cellular telephone location system device, and an accelerometer or inertial positioning device; a motion detection sensor for detecting when the apparatus is in motion; a central processor sub-system for data retrieval and transmission activated when the motion detection sensor detects motion, the data retrieval and transmission function comprises the assembling of data from the unique identification code, the date and clock data, and the location data at predetermined period time intervals, and subsequent transmission of the assembled data to a remote location; a memory for storing assembled data from the central processor sub-system; and a transmitter and receiver for transmitting and receiving data to and from the apparatus, the data comprises at least one of the unique identification code and the assembled data. Additionally, the unique identification code and the transmitter and receiver comprises a radio frequency identification device.

The electronic identification and data logging device of the second sub-system and the general system, and the electronic identification and data transmission device of the alternative general system of the second embodiment above, comprises a radio frequency identification device.

The second sub-system, the general system, and the alternative general system of the second embodiment above, further comprises an output device for outputting information related to the unique identification code, wherein the output device comprises a coupon printer device for printing coupons related to the unique identification code.

Additional sub-systems in communication with the general systems identified in the first and second embodiments above, are identified below.

A printer service is connected via a communication link with the remote central data processing system for printing material including a graphical representation. The remote central data processing system receives information related to a unique identification code and transmits a printer service order to the printer service based on processing the at least one stored data record at the remote central processing, data station or processing the received information related to a unique identification code.

A retail service location having the display device located thereon and a printer output device, both connected to the remote central data processing system via a communication link. The remote central data processing system receives information related to a unique identification code and transmits information to the retail service location regarding installation and payment for a graphical representation or an electronic identification device to be installed on a moveable object. The transmission of information to the retail service location is based on processing the at least one stored data record at the remote central processing data station, or processing the received information related to the unique identification code.

The remote central data processing system receives information related to a unique identification code and transmits information to the payment issuing agent regarding the issuing of payment for services performed based on processing the at least one stored data record at the remote central processing data station, or processing the received information related to the unique identification code.

The remote central data processing system receives information related to a unique identification code associated with the electronic identification device of the moveable object and transmits information to an operator or owner of the moveable object based on processing the at least one stored data record at the remote central processing data station or processing the received information related to the unique identification code.

The remote central data processing system receives information related to a unique identification code and transmits information to a client based on processing the at least one stored data record at the remote central processing data station or processing the received information related to the unique identification code. Additionally, the transmitted information may comprise data representing date and time geographic location map overlays of related to at least one specific unique identification code.

The remote central data processing system transmits information to a retail sales location related to a solicitation of moveable objects for use within said moveable object accountability system, wherein said solicitation comprises advertising information, or rebates or coupons toward the purchase of merchandise.

The remote central data processing system transmits information to and receives information from a point of sale terminal in communication with the remote central processor. The point of sale terminal receives from the remote central data processor information related to the solicitation of owners or operators of moveable objects to enroll their moveable objects in the accountability system of the present invention, and transmits to said remote central data processor accountability system enrollment information of owners or operators of moveable objects.

The accountability system for verifying a condition on a moveable object of the present invention will become more readily apparent from a consideration of the following drawings and description.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

The first embodiment of the invention generally deals with a moveable object having a electronic identification device that communicates a unique identification code to a data collecting verification device which collects additional information about the moveable object and a condition of the moveable object for transmission to a remote database and data processing system.

Figure 1:
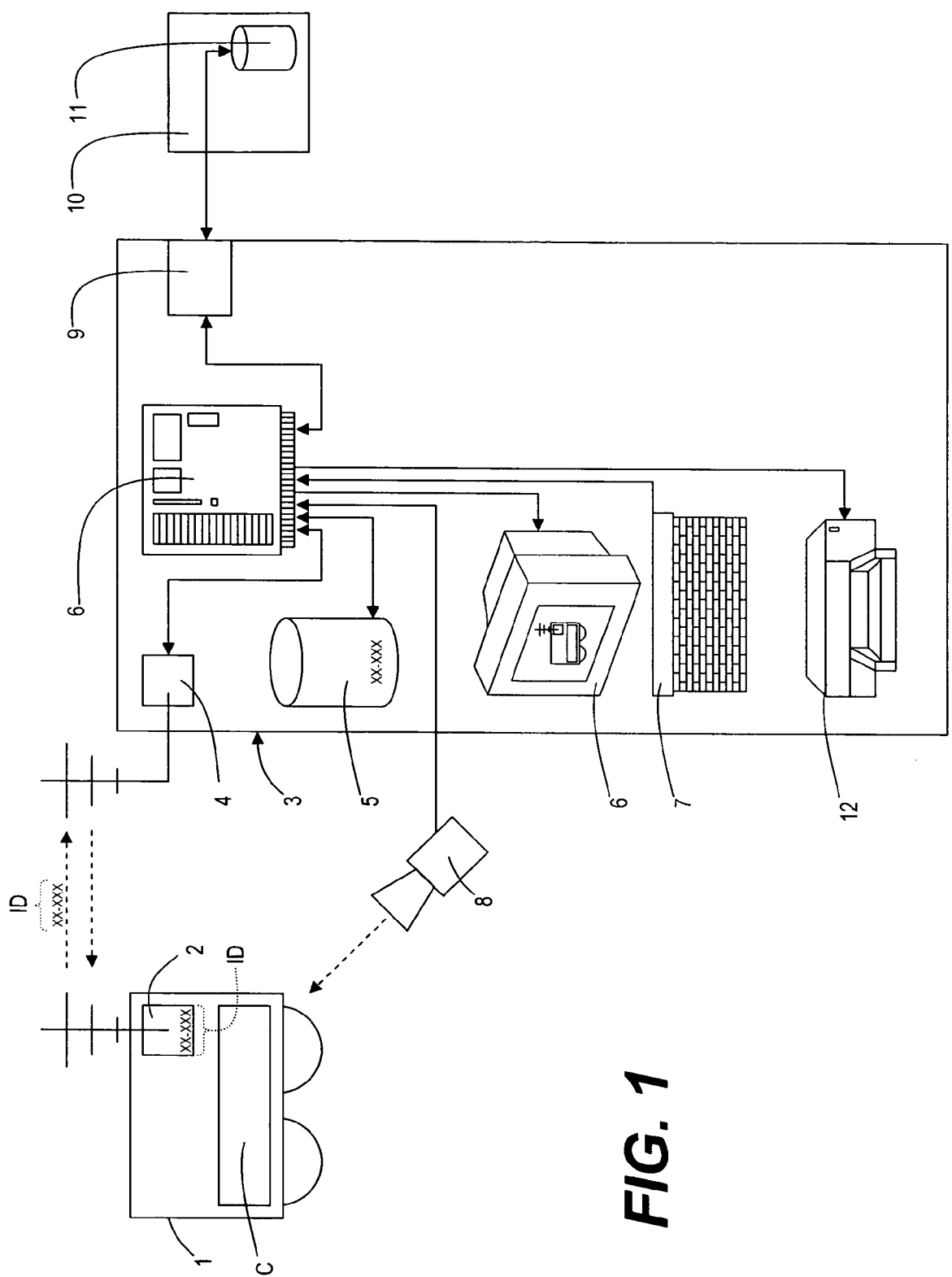
FIG. 1 shows a pictorial diagram of the moveable object accountability system.

FIG. 1 shows a moveable object (1) that anticipates any object capable of being in a different location at different times. One object of the invention is to independently verify a certain condition of or on the moveable object on a periodic basis. This condition, (illustrated in FIG. 1 by reference character "C"), could be one of many items related to the moveable object, such as a visible indication of certain distinguishing characteristics of the moveable object, e.g., the make, model and color of a vehicle, a visible licensing indicator of the moveable object, e.g., a license plate or a registration tag, or a graphical representation on the moveable object, e.g., an advertisement or placard. For example, in the situation where an advertisement is placed on the movable object under contract with the system of the present invention by an advertising client, it is necessary to provide some type of accountability to the advertising client to determine if the advertisement is still on the moveable object. The information necessary for verification of a certain condition may comprise different types of data depending on the information requirement of the client interested in verifying the condition on the moveable object.

In the present invention, the moveable object (1) has an electronic identification device (2) mounted on it. This electronic identification device (2) has an associated unique identification code (illustrated in FIG. 1 by reference characters "ID") that can be electronically transmitted in a signal to receiving devices that request the identification code (ID). The unique identification code (ID) may be a permanent hardware MAC address or the like, and the electronic identification device (2) may be a transmitting and receiving radio frequency identification device (RFID).

In the preferred embodiment, a data verification station (3) can be located at either a fixed location in a form of a kiosk or a walk-up ATM-like machine, or may be a transportable mobile operating unit. The data verification station (3) has an electronic signal transmission and reception device (4) that can automatically determine the presence of and initiate communication with the electronic identification device (2) on the moveable object (1) to request the transmission of the unique identification code. The electronic identification device (2) receives the request and transmits the unique identification code (ID) for reception by the electronic signal transmission and reception device (4). The transmission path may be via a wireless RF signal with corresponding antennas (as shown in FIG. 1), or may be via a connected wired signal path.

A local database (5) has stored information related to the unique identification code (ID), the moveable object (1) and at least one condition (C) of the moveable object that has previously been received from a remote central processor (10). A data processor (6) compares the received unique identification code (ID) with the stored information related to the unique identification code. The data processor issues a query to a display device (6) that prompts an owner or operator of the moveable object (1) to input data at an input device (7) to verify information regarding the unique identification code (ID), the moveable object (1) or at least one condition (C) of the moveable object.

Once the data processor (6) verifies the input data as being correctly associated with the stored data in the local database (5), a camera (8) captures a digital image of the moveable object (1) such that the digital image includes a representation of at least one previously mentioned condition (C) of the moveable object (1). Under the data processor's (6) control, the digital image is then sent to and displayed at the display device (6) along with a query or information including or related to the unique identification code (ID). The owner or operator of the moveable object (1) inputs the requested data and verifies that the digital image is correctly displaying the specific condition (C) on the moveable object (1). The input data at this point may comprise travel history data of the moveable object, including odometer readings and other specific travel history reporting or conditions.

After the requested information is input to the data processor (6), the data processor (6) assembles a data record comprising the current date and time the final input was received, the received unique identification code (ID) from the electronic identification device (2), the digital image from the camera including the verified representation of at least one condition (C) of the moveable object (1), and any data received from the input device. The data record is then temporarily stored in a memory location, preferably in a free memory register of the data processor (6) or in a file in the local database (5) for subsequent transmission by a data transmitter/receiver (9) via an external communication link to a remote central processor (10) having remote central storage device (11).

The data verification station (3) additionally has an printer output device (12) for outputting information specifically related to the unique identification code of the moveable object. The output device may comprise of a receipt, coupon or advertisement printing device having information specific to the owner or operator of the moveable object as determined by the unique identification code. Additional hardware at the data verification station (3) may also include a credit card or magnetic strip card-reader for inputting financial institution data of an owner or operator of a moveable object, a barcode scanner for inputting information from barcode systems, and a product or cash equivalent dispenser.

Figure 2:
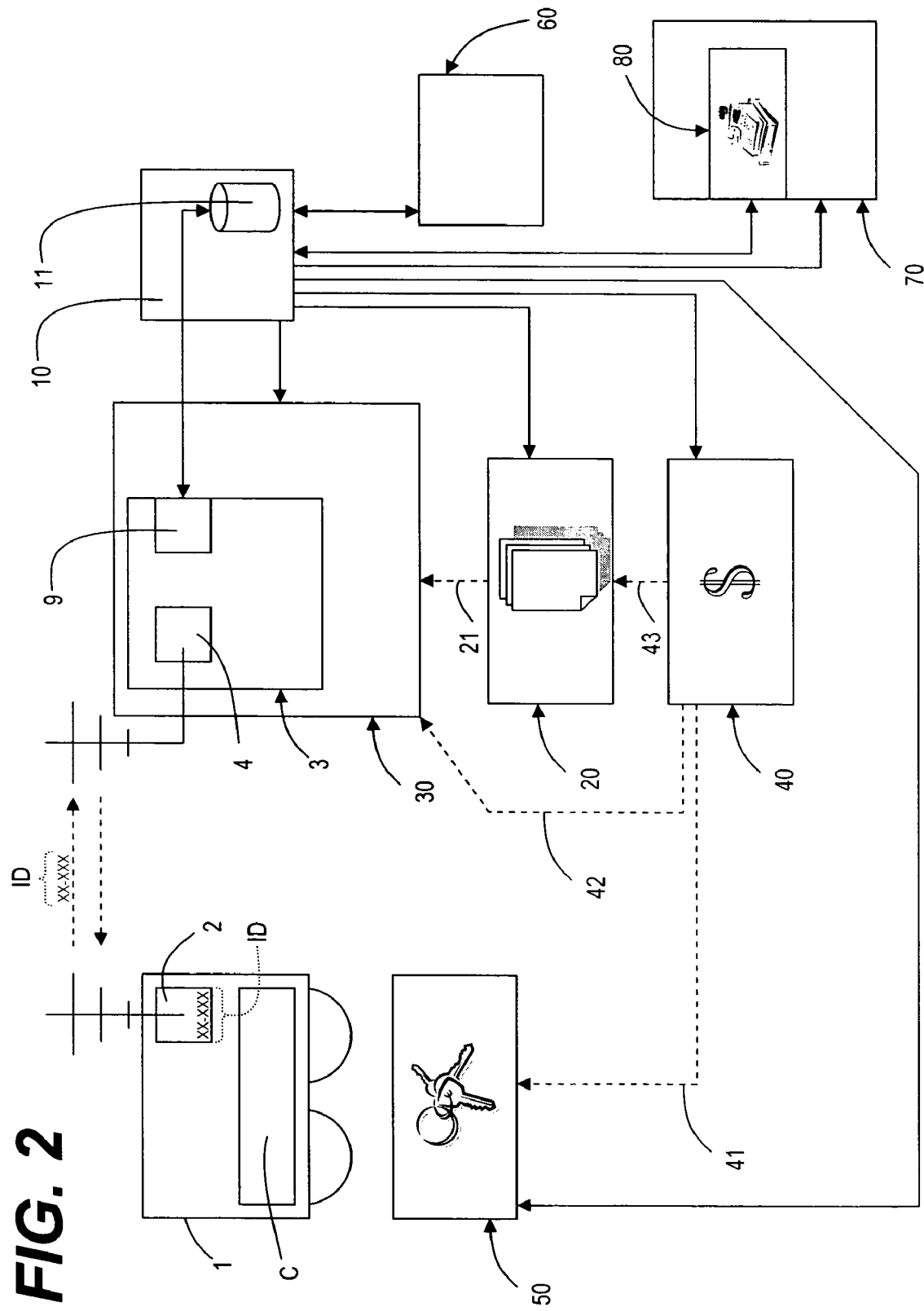
FIG. 2 shows an expanded pictorial diagram of the moveable object accountability system with additional system components and their communication paths.

FIG. 2 illustrates additional system components of the present invention in communication with the remote central processor (10) that receive and transmit information based on the remote central processor (10) processing at least one of a plurality of transmitted data records related to specific unique identification codes (ID).

A printer service (20) in communication with the remote central processor (10) receives information from the remote central processor (10) related to a unique identification code. The information may contain specifications for a printing graphical representation for use on a moveable object subject to the previously mentioned accounting of a condition (C) on the moveable object (1). Additionally, the received information may contain owner or operator information and retail service information related to the printed material information. This allows the printer service (20) to ship (21) the ordered graphical representation to a specific retail service location with installation information about a specific owner or operator of a moveable object that will have the graphical representation installed thereon by personnel at the retail service location. The communication of the information received at the printing service is based on processing received information at the remote central processor (10) related to a unique identification code (ID), wherein the received information may be information regarding the assembled and stored data record transmitted by the data verification station (3).

A retail service location (30), having the data verification station (3) located thereon, in communication with the remote central processor (10) receives information from the remote central processor (10) related to a unique identification code. The information may contain instructions for printed graphical representation and an electronic identification device (2) installation on specific moveable objects (1) and related work order and payment information. This information allows the retail service location (30) to schedule installations on moveable objects (1) and keep records for payments due. Additionally, the retail service location (30) may input data related to printed graphical representation and electronic identification device installations on specific moveable objects via the data verification station (3) located therein for communication to the remote central processor (10). This data may comprise notification of finished installations for approval of payment and the like. The communication of the information received at the retail service location (30) is based on processing received information at the remote central processor (10) related to a unique identification code (ID), wherein the received information may be information regarding the assembled and stored data record transmitted by the data verification station (3).

A payment issuing agent (40) in communication with the remote central processor (10) receives payment information from the remote central processor (10) related to a unique identification code. The payment information may comprise instructions for payment type, (e.g., electronic funds transfer, credit card, check, retail cash or merchandise vouchers, and the like), payment amount, payee identification and address, or associated purchase/work order information. The payment agent then issues the appropriate payment to the specified entity for compensation for services performed, in the case of the owner or operator of the moveable objects (41) with a contractual obligation to display a graphical representation or advertisement on their moveable object, and in the case of the retail service location (42) for installation of the above mentioned products, or compensation for product ordered in the case of the printer service (43). The communication of the information received at the payment issuing agent (40) is based on processing received information at the remote central processor (10) related to a unique identification code (ID), wherein the received information may be information regarding the assembled and stored data record transmitted by the data verification station (3).

An owner or operator (50) of a specific moveable object (1) is in communication with the remote central processor (10) and receives information from the remote central processor (10) related to his unique identification code (ID) associated with his moveable object (1) or a specific condition (C) thereof. The communication may comprise of various types of well known communication methods and electronic media, e.g., mail, electronic mail (e-mail), telephone notification, instant messaging, pager, web-browser interface, etc. This communication with the remote central processor (10) informs the owner operator (50) of any relevant information with respect to his unique identification code or any condition (C) related to his moveable object within the accountability system. The communication of the information received by the owner or operator (40) is based on processing received information at the remote central processor (10) related to his unique identification code (ID), wherein the received information may be information regarding his assembled and stored data record transmitted by the data verification station (3).

A client (60) subscribing to the accountability system is in communication with the remote central processor (10) and receives information from the remote central processor (10) related to unique identification codes (ID) associated with certain moveable objects (1) and a specific condition (C) thereof. The client ultimately compensates owners or operators of moveable objects when a certain client prescribed condition on the owners' or operators' moveable objects is verified with the present invention's accountability system. The communication between the client (60) and the remote central processor (10) may take the form of requests by the client to create or modify a class of specific conditions on a number of moveable objects within the accountability system. Additionally, the remote central processor (10) can transmit to the client accumulated accountability reports processed from the assembled and stored data records transmitted by the data verification station (3) related to any specific or all unique identification codes the client may have contracted for. These accumulated accountability reports may include all the data from the assembled and stored records or may present only certain filtered data from the totality of data.

In the second embodiment, described below, a data logged or real time transmitted location coordinate with date and time data is stored with respect to unique identification codes. The location coordinate with date and time data may then be presented to the client (60) in a geographic map overlay presentation potentially showing every time identified route of every unique identification code the client has contracted for any client specific condition. The communication of the information reports received by the client (60) is based on processing received information at the remote central processor (10) related to the client's contracted unique identification codes (ID), and the received information regarding the assembled and stored data record transmitted by the data verification station (3).

A retail sales location (70) in communication with the remote central processor (10) receives information from the remote central processor (10) related to the solicitation of owner or operators of moveable objects to enroll their moveable objects in the accountability system of the present invention. Information related to the solicitation of owner or operators of moveable objects may comprise promotional advertising information, rebates or coupons toward the purchase of merchandise, and other incentive information.

A point of sale terminal (80) in communication with the remote central processor (10) receives information from and transmits information to the remote central processor (10) related to the solicitation of owner or operators of moveable objects to enroll their moveable objects in the accountability system of the present invention. Information related to the solicitation of owner or operators of moveable objects may comprise promotional advertising information, direct merchandise rebates at the point of sale, and other incentive information. The point of sale terminal is also able to transmit accountability system enrollment information of owners or operators of moveable objects to the remote central processor (10).

The second embodiment of the invention generally deals with a moveable object having a data logging or data transmission device with an electronic identification device that communicates a unique identification code and any logged data to a data collecting verification device which collects additional information about the moveable object and a condition of the moveable object for transmission to a remote database and data processing system.

The second general embodiment of this invention modifies the electronic identification device (2) of FIGS. 1–2, with a internally powered data logging feature able to record location, date and time data on a period interval when the electronic identification data logging device has detected itself to be in motion via a motion detector (90). In this second embodiment, see FIG. 4, the electronic identification and data logging device (91) comprises a central processing unit (92) that assembles a data record on a periodic interval comprising the unique identification code (ID) generated by the electronic identification device (93), date and time data generated by a data and time signal generator or a data and time signal receiver (94), and location identification data generated from a location coordinate device (95) that determines a geographic coordinate location. This location identification data can be generated by location devices such as a global positioning system (GPS) device, a cellular telephone location system device or an accelerometer or inertial positioning device. A combination of these listed devices would provide redundant operation should one device fail to generate a location signal, e.g., being able to provide a location coordinate based on the inertial positioning device calculating a current location position off of the last GPS coordinate if the GPS device travels into an area where satellite reception is lost and its output is prevented. Again, the unique identification code may be a transmitting and receiving radio frequency identification device (RFID) as the first general embodiment. Once the data record is assembled by the central processing unit (92), it is stored in a memory (96) in the identification data logging device and subsequently transmitted via a transmitter/receiver to a data verification and collection station, in similar manner to the data verification station (3) of FIGS. 1–2.

Figure 4:
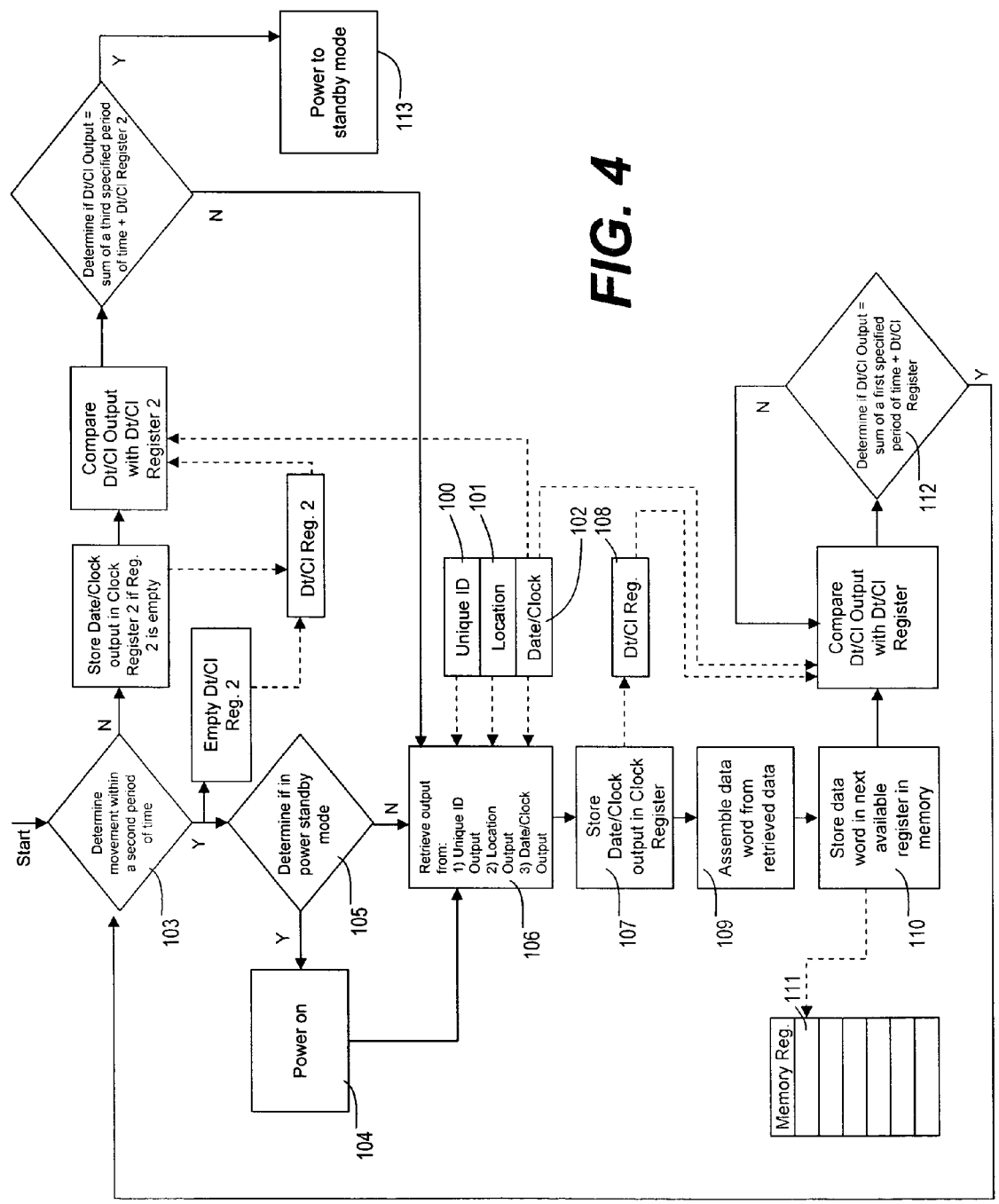
FIG. 4 shows a flowchart diagram of a data logging function for an electronic identification and data logging device described in a second embodiment of the moveable object accountability system.

FIG. 4 shows a procedural flowchart of a method for collecting data on the location position of a moveable object electronic identification and data logging device, the data logging device having a unique identifier address code (100), a location identification output device (101), and a date and time signal output generator (102).

The method comprising the steps of determining movement of the data logging device (103); powering on the data logging device from a data logging power standby mode (104) if in the power standby mode based on the step of determining movement of the data logging device (105); retrieving the unique identifier address datum, a position datum from the location identification device, and current date and time data from the date and clock signal generator (106); storing date and time data (107) in a date and clock memory register (108); assembling the unique identifier address datum, a position datum from the location identification device, and current date and time data from the date and clock signal generator into data record (109) from the step of retrieving; storing (110) the data record in a memory (111) in the data logging device; determining (112) when the data and clock signal output equals the sum of a first specified period of time and the stored date and time data in the data and clock memory register, (wherein the first specified period of time is the data sampling rate); determining movement of the data logging device within a second specified period of time (103), (wherein the second specified period of time is the motion detector gate time, e.g., 30 seconds); repeating the steps designated by reference numbers (103) to (112) when determining movement of the data logging device within a second specified period of time (103) determines movement within the second specified period of time. i.e., the motion detector gate time; repeating the steps designated by reference numbers (103) to (112) when determining movement of the data logging device within a second specified period of time (103) determines no movement within the second specified period of time and when date/clock output (108) is less than the sum of a third specified period of time and the stored clock register data, (wherein the third specified period of time is the power to standby time—when no motion is detected the unit will power to standby mode; location output data collected in this loop should all be identical); powering down the data logging device (113) to standby power when determining movement of the data logging device within a second specified period of time (103) determines no movement within the second specified period of time and when date/clock output is equal to or greater than the sum of a third specified period of time and the stored clock register data.

Figure 3:
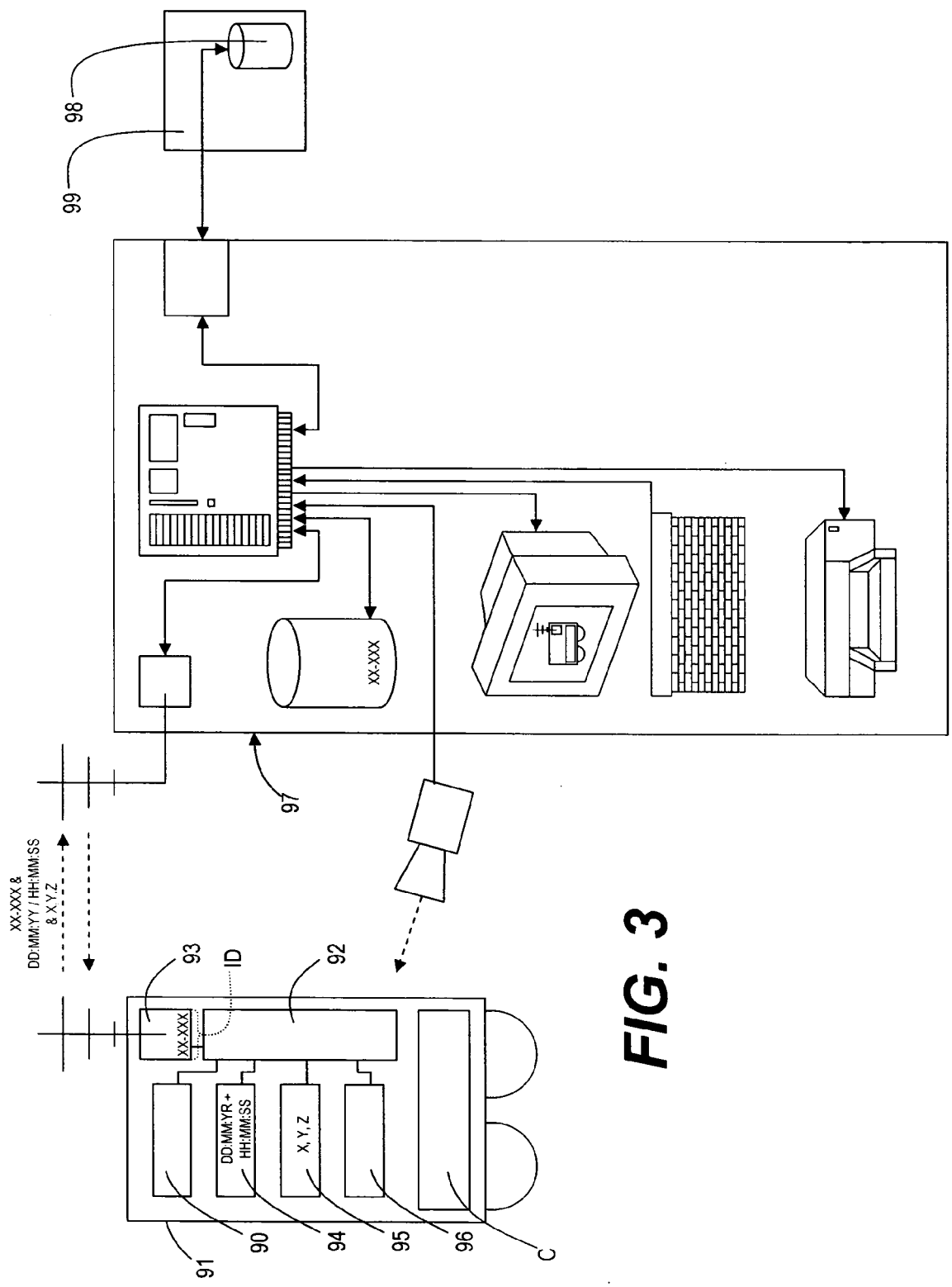
FIG. 3 shows a pictorial diagram of the second embodiment of the invention including a electronic identification device on a moveable object including a data logging feature that records location, date and time data in addition to the unique identification code.

In the second embodiment of the invention, the data verification station (3) of FIGS. 1–2 which received the unique identification code in the first embodiment, is now only functionally modified as shown in FIG. 3 (as reference number 97 indicates) to include the capacity for data collection of the assembled data from the electronic identification and data logging device (91) in addition to the unique identification code (ID). The assembled data temporarily stored in the memory (96) on the electronic identification and data logging device (91), as described immediately above, is now transmitted to the data verification and collection station (97) in a manner similar to the unique identification code of the first embodiment. The data verification and collection station (97) verifies, complies, stores and transmits to the remote central storage device (98) of the remote central processor (99), the assembled and transmitted data in addition to the same data and verification information and in the same manner as described in the first embodiment.

Figure 5:
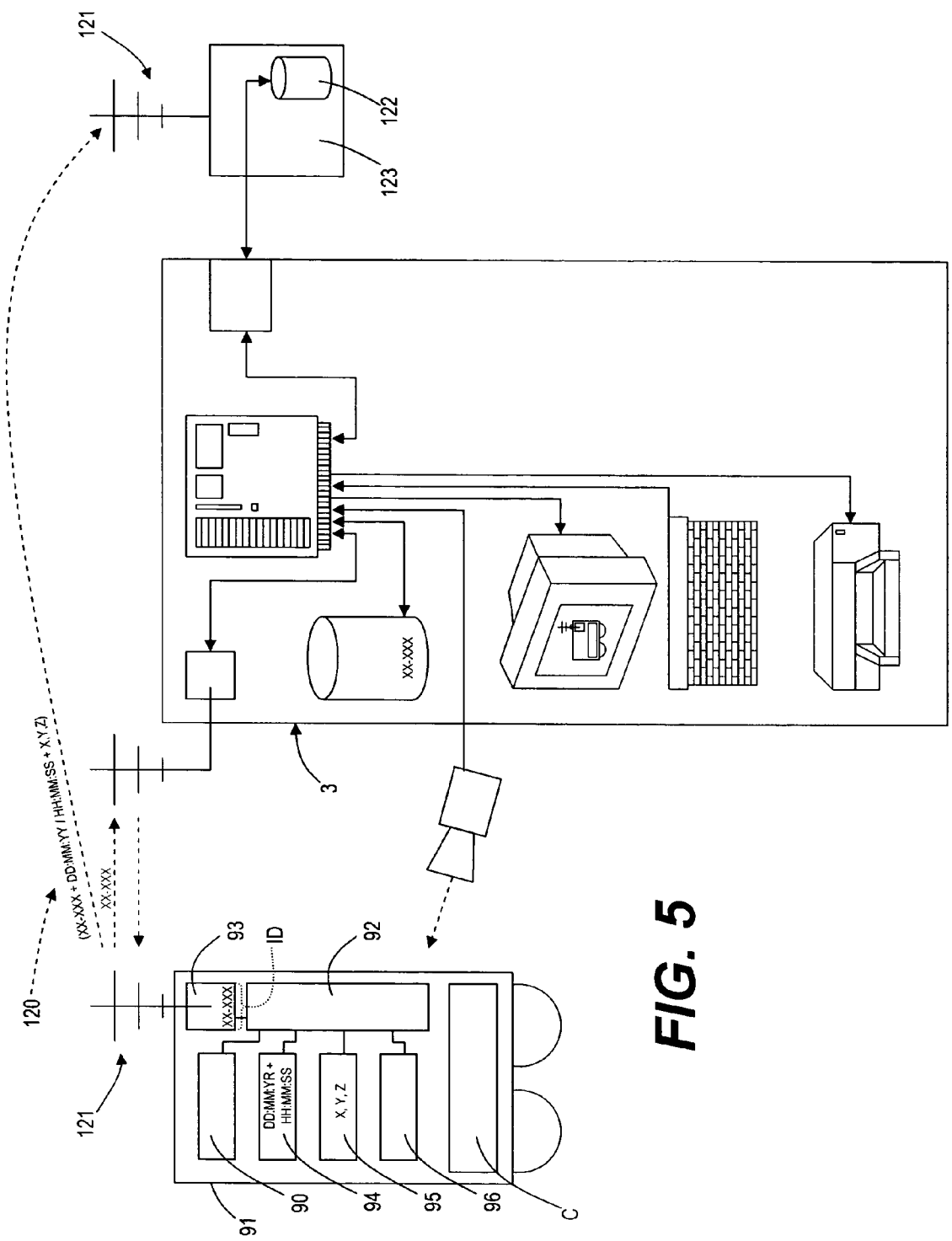
FIG. 5 shows a pictorial diagram of an alternative to the second embodiment of the invention including a electronic identification device on a moveable object including a real-time data transmission feature of assembled data including location, date and time data in addition to the unique identification code.

An alternative system of the second embodiment shown in FIG. 5 of the moveable object accountability system adds to the data logging feature of the electronic identification and data logging device (91) a real-time data transmission function. In this embodiment, the assembled data of the moveable object comprising the unique identifier code, location data, and date and time data (represented by ref. no. 120) is transmitted in real-time via a wireless transmission communication system (121) to the remote central storage device (122) of the remote central processor (123). The accountability verification system and procedure at the data verification station (3) of the first embodiment of this invention as shown in FIGS. 1–2 is identical to current alternative system of the second embodiment. However, the data transmitted (120) in real-time to the remote storage device (122) of the remote central processor (123) is correlated by the remote central processor (123) for subsequent processing based on matching identification codes (ID) with the data transmitted from the data verification system (3) of FIGS. 1–2 once that data is transmitted to the remote central processor (123).

The foregoing disclosure and description of the invention are illustrative and explanatory thereof and various changes in size shape and materials as well as in the details of the illustrated construction may be made without departing from the spirit of the invention.

What is claimed is:

1. A moveable object accountability system for monitoring the status of at least one condition of a moveable object, wherein said at least one condition comprises one of a visible indication of distinguishing characteristics of said moveable object, a visible licensing indicator of said moveable object, and a graphical representation on said moveable object, said moveable accountability system comprising:

an electronic identification device mounted on said moveable object, wherein said electronic identification device has a unique identification code and said electronic identification device electronically transmits a signal containing information of said unique identification code;

an electronic signal transmission and reception device for initiating communication with said electronic identification device and receiving said signal containing information of said unique identification code from said electronic identification device mounted on said moveable object;

a local database having stored information related to said unique identification code, said moveable object and said at least one condition of said moveable object;

a camera capturing a first image of said moveable object, wherein said first image includes a representation of said at least one condition of said moveable object;

a display device for displaying information contained in said first image, and displaying a query or information including or related to said unique identification code;

an input device for inputting data related to said moveable object or inputting a response to said query displayed at said display device;

a data processing sub-system coupled to said electronic signal transmission and reception device, said local database, said camera, said display device and said input device, wherein said data processing sub-system is:

1) configured to compare said signal containing information of said unique identification code with information related to said unique identification code in said local database;

2) configured to display, at said display device, graphical information contained in said first image and a query to validate information related to said moveable object and information related to said unique identification code; and 3) configured to compare input data received from said input device in response to said query to data stored in said local database;

means, within said data processing sub-system for compiling data received from said unique identification code received from said electronic signal transmission and reception device, said camera, and said input device into a data record;

a memory location within said local database for storing said data record; and a communication link between said local database and a remote storage device for transmitting at least one stored data record to said remote storage device.

2. The moveable object accountability system of claim 1, wherein said electronic identification device comprises a radio frequency identification device.

3. The moveable object accountability system of claim 1, further comprises an output device for outputting information related to said moveable object.

4. The moveable object accountability system of claim 3, wherein said output device comprises coupon printer device.

5. A method of collecting accountability data for a moveable object, said method of collecting comprising the steps of:

determining the presence of an electronic identification device;

querying said electronic identification device to output a unique identification code;

receiving said output unique identification code;

comparing said received unique identification code with information related to said received unique identification code in a local database;

capturing a digital image of a moveable object including a representation of at least one condition, wherein said at least one condition comprises one of a visible indication of distinguishing characteristics of said moveable object, a visible licensing indicator of said moveable object, and a graphical representation on said moveable object;

displaying at a display device said representation of said at least one condition of said moveable object from said step of capturing and a verification query based on said step of comparing;

receiving input based on said step of displaying;

comparing said received input with related data stored in said local database;

assembling a data record comprising information contained in said unique identification code, said captured digital image of said moveable object including a representation of at least one condition, and said received input, based on said step of comparing;

storing said assembled data record in a local database; and transmitting said stored data record to a remote database.

6. An apparatus comprising:

an electronic signal transmission and reception device for initiating communication with a remote electronic identification device and for receiving a signal containing information of a unique identification code from said remote electronic identification device mounted on a moveable object;

a local database having stored information related to said unique identification code, said moveable object and information related to at least one condition of said moveable object;

a camera for capturing a first image of said moveable object, wherein said first image includes a representation of said at least one condition of said moveable object, said at least one condition comprising one of a visible indication of distinguishing characteristics of said moveable object, a visible licensing indicator of said moveable object, and a graphical representation on said moveable object;

a display device for displaying information contained in said first image, and displaying a query or information including or related to said unique identification code;

an input device for inputting data related to said moveable object or a response to said query displayed at said display device;

a data processor coupled to said electronic signal transmission and reception device, said local database, said camera, said display device and said input device;

a memory within said local database for storing a data record compiled by said data processor from information received from said electronic signal transmission and reception device, said camera, and said input device; and a communication link between said local database and a remote storage device for transmitting at least one stored data record to said remote storage device.

7. The apparatus of claim 6, wherein said remote electronic identification device comprises a radio frequency identification device.

8. The apparatus of claim 6, further comprises an output device for outputting information related to said unique identification code.

9. The apparatus of claim 8, wherein said output device comprises a coupon printer device for printing coupons related to said unique identification code.

10. A moveable object accountability system for monitoring the status of at least one condition of a moveable object, wherein said at least one condition comprises one of a visible indication of distinguishing characteristics of said moveable object, a visible licensing indicator of said moveable object, and a graphical representation on said moveable object, said moveable accountability system comprising:

an electronic identification device mounted on said moveable object, wherein said electronic identification device has a unique identification code and said device is able to electronically transmit a signal containing information of said unique identification code;

an electronic signal transmission and reception device for initiating communication with said electronic identification device and receiving said signal containing information of said unique identification code from said electronic identification device mounted on said moveable object;

a local database having stored information related to said unique identification code, said moveable object and said at least one condition of said moveable object;

a camera capturing a first image of said moveable object, wherein said first image includes a representation of said at least one condition of said moveable object;

a display device for displaying graphical information contained in said first image, and displaying a query or information including or related to said unique identification code;

an input device for inputting data related to said moveable object or responses to said query regarding information displayed at said display device;

a data processing sub-system coupled to said electronic signal transmission and reception device, said local database, said camera, said display device and said input device, wherein said data processing sub-system is:

1) configured to compare said signal containing information of said unique identification code with related information related to said unique identification code in said local database;

2) configured to display, at said display device, graphical information contained in said first image and a query to validate information related to said moveable object and information related to said unique identification code; and 3) configured to compare input data received from said input device in response to said query to data stored in said local database;

means within said data processing sub-system for compiling data received from said unique identification code received from said electronic signal transmission and reception device, said camera, and said input device into a data record;

a memory within said data processing sub-system for storing said data record;

a remote central processing data system having a central storage database;

a communication link between said local database and said remote central data processing system for transmitting information between said remote central data processing system and said local database; and means for processing said at least one stored data record at said remote central processing data system.

11. The moveable object accountability system of claim 10, wherein said electronic identification device comprises a radio frequency identification device.

12. The moveable object accountability system of claim 10, further comprising an output device for outputting information related to said unique identification code.

13. The moveable object accountability system of claim 12, wherein said output device comprises a coupon printer device for printing coupons related to said unique identification code.

14. The moveable object accountability system of claim 10, further comprising:

a printer service connected via a second communication link with said remote central data processing system, said printer service for printing said graphical representation; and wherein said remote central data processing system is further configured to receive and process information related to a unique identification code and to transmit a printer service order to said printer service based on the received information related to a unique identification code, wherein said received information related to a unique identification code comprises an assembled and stored data record.

15. The moveable object accountability system of claim 10, further comprising:
a retail service location having said display device located thereon and a printer output device, both connected to said remote central data processing system via said communication link; and
wherein said remote central data processing system is further configured to receive and process said information related to a unique identification code and to transmit
to said retail service location information regarding installation and payment for a graphical representation or said electronic identification device to be installed on a moveable object, based on the received information related to a unique identification code, wherein said received information related to a unique identification code comprises an assembled and stored data record.

16. The moveable object accountability system of claim 10, further comprising:
a payment issuing agent connected to said remote central data processing system via a second communication link; and
wherein at said remote central data processing system is further configured to receive and process information related to a unique identification code, and to transmit said
information related to a unique identification code to said payment issuing agent regarding the issuing of payment for services performed based on the received information related to a unique identification code, wherein said received information related to a unique identification code comprises an assembled and stored data record.

17. The moveable object accountability system of claim 10, wherein
said remote central data processing system is further configured to communicate to an operator or owner of said moveable object via a second communication link, and to receive
information related to a unique identification code associated with said electronic identification device of said moveable object, and to transmit said
information related to a unique identification code to said operator or owner of said moveable object based on the received information related to a unique identification code, wherein said received information related to a unique identification code comprises an assembled and stored data record.

18. The moveable object accountability system of claim 10, further comprising:
a client in communication with said remote central data processing system via a second communication link; and
wherein said remote central data processing system is configured to receive and process said information related to a unique identification code, and to transmit said
information related to a unique identification code to said client based on the received information related to a unique identification code, wherein said received information related to a unique identification code comprises an assembled and stored data record.

19. The moveable object accountability system of claim 18, wherein said transmitted information comprises data representing date and time geographic location map overlays of at least one specific unique identification code.

20. The moveable object accountability system of claim 10, further comprising:
a retail sales location in communication with said remote central data processing system via a second communication link; and
wherein said remote central data processing system is further configured to communicate information related to a solicitation of moveable objects for use within said moveable object accountability system;
wherein said solicitation comprises advertising information, or rebates or coupons toward the purchase of merchandise.

21. The moveable object accountability system of claim 10, further comprising:
a point of sale terminal in communication with said remote central data processing system via a second communication link;
wherein said point of sale terminal is further configured to receive from said remote central data processing system information related to the solicitation of owners or operators of moveable objects to enroll their moveable objects in the accountability system of the present invention; and
said point of sale terminal is further configured to transmit to said remote central data processing system accountability system enrollment information of owner or operators of moveable objects.

22. A data logging system for logging the position of a moveable object, said data logging system comprising:
a motion detection sensor outputting a signal when motion is detected of said data logging system;
a location identification signal generator determining the geographic coordinates of said data logging system and outputting geographic coordinates as location data;
a date and clock signal generator outputting current date and time data;
a unique identification code specific to and stored in said data logging system;
a data processing sub-system coupled to the outputs of said motion detection sensor, said location identification sensor, said date and clock signal generator, and said unique identification code;
means, within said data processing sub-system, for determining a motion detected signal from said motion detector sensor output;
means, within said data processing sub-system, based on said means for determining said motion detected signal, for retrieving:
1) said unique identification code of said data logging system;
2) said location data from said location identification signal generator output; and
3) said current date and time data from said data and clock signal generator; means, within said data processing central processor, for assembling said retrieved data into a single data record;
an incremental memory register in said data processing sub-system stores said data record in a next available memory register; and a transmitter and receiver for transmitting the contents of said memory register including said stored data record from said data logging system to a remote storage device.

23. The data logging system of claim 22, wherein said location identification signal generator comprises one of a global positioning system output device, a cellular telephone location system device, and an accelerometer or inertial positioning device.

24. An apparatus comprising:
an electronic signal transmission and reception device for initiating communication with a remote electronic identification and data logging device mounted on a moveable object to receive a signal containing information of a unique identification code, and to receive assembled and stored data comprising assembled information of said unique identification code, location coordinate data, and corresponding date and time data from said remote electronic identification and data logging device;
a local database having stored information related to said unique identification code, said moveable object and information related to at least one condition of said moveable object;
a camera for capturing a first image of said moveable object, wherein said first image includes a representation of said at least one condition of said moveable object, said at least one condition comprising one of a visible indication of distinguishing characteristics of said moveable object, a visible licensing indicator of said moveable object, and a graphical representation on said moveable object;
a display device for displaying graphical information contained in said first image, and displaying a query or information including or related to said unique identification code;
an input device for inputting data related to said moveable object or responses to said query regarding information displayed at said display device;
a data processor coupled to said electronic signal transmission and reception device, said local database, said camera, said display device and said input device;
a memory within said data processing sub-system for storing a data record compiled by said data processor from information received from said electronic signal transmission and reception device, said camera, and said input device; and
a communication link between said local database and a remote storage device for transmitting at least one stored data record to said remote storage device.

25. The apparatus of claim 24, wherein said remote electronic identification and data logging device comprises a radio frequency identification device.

26. The apparatus of claim 24, further comprises an output device for outputting information related to said unique identification code.

27. The apparatus of claim 26, wherein said output device comprises a coupon printer device for printing coupons related to said unique identification code.

28. A moveable object accountability system for monitoring the status of at least one condition of a moveable object, wherein said at least one condition comprises one of a visible indication of distinguishing characteristics of said moveable object, a visible licensing indicator of said moveable object, and a graphical representation on said moveable object, said moveable accountability system comprising:

an electronic identification and data logging device mounted on said moveable object, wherein said electronic identification and data logging device has a unique identification code and stored data comprising assembled information of said unique identification code, location coordinate data, and corresponding date and time data, said electronic identification and data logging device having a transmitter for transmitting a signal containing information of said unique identification code and said stored data;
an electronic signal transmission and reception device for initiating communication with said electronic identification and data logging device and receiving said unique identification code and said stored data from said electronic identification and data logging device mounted on said moveable object;
a local database having stored information related to said unique identification code, said moveable object and said at least one condition of said moveable object;
a camera for capturing a first image of said moveable object, wherein said first image includes a representation of said at least one condition of said moveable object;
a display device for displaying graphical information contained in said first image, and displaying a query or information including or related to said unique identification code;
an input device for inputting data related to said moveable object or responses to said query regarding information displayed at said display device;
a data processing sub-system coupled to said electronic signal transmission and reception device, said local database, said camera, said display device and said input device, said data processing sub-system for comparing said signal containing information of said unique identification code with information related to said unique identification code in said local database, and for displaying, at said display device, graphical information contained in said first image and a query to validate information related to said moveable object and said unique identification code;
means, within said data processing sub-system, for compiling information received from said electronic signal transmission and reception device, from said camera, and from said input device into a data record;
a memory within said local database of said data processing sub-system for storing said data record; and
a communication link between said local database and a remote database for transmitting said information comprising said data record between said local database and said remote database.

29. The moveable object accountability system of claim 28, wherein said electronic identification and data logging device further comprises:
a motion detection sensor outputting a signal when motion of said electronic identification and data logging device is detected;
a location identification signal generator for determining the geographic coordinates of said electronic identification and data logging device and for outputting geographic coordinates as location data, wherein said location identification signal generator comprises one of a global positioning system output device, a cellular telephone location system device, and an accelerometer or inertial positioning device;
a date and clock signal generator for outputting current date and time data;

a unique identifier code specific only to and stored in said data logging system;
a data processing sub-system coupled to the outputs of said motion detection sensor, said location identification sensor, said date and clock signal generator, and said unique identification code;
means, within said data processing sub-system, for determining a motion detected signal from said motion detector sensor output;
means, within said data processing sub-system, based on said means for determining said motion detected signal, for retrieving:
  1) said unique identification code of said electronic identification and data logging device;
  2) said location data from said location identification signal generator output; and
  3) said current date and time data from said data and clock signal generator; means, within said data processing central processor, for assembling said retrieved data into a single data record;
an incremental memory register in said data processing sub-system stores said data record in a next available memory register; and
a transmitter for transmitting the contents of said memory register including said stored data record from said electronic identification and data logging device to a remote storage device.

30. The moveable accountability system of claim 28, wherein said electronic identification and data logging device comprises a radio frequency identification device.

31. The moveable accountability system of claim 29, wherein said unique identifier code and said transmitter and receiver comprises a radio frequency identification device.

32. The moveable accountability system of claim 28, further comprising an output device for outputting information related to said unique identification code.

33. The moveable accountability system of claim 32, wherein said output device comprises a coupon printer device for printing coupons related to said unique identification code.

34. A method for collecting data on the position of a moveable object having a data logging device, said data logging device having a unique identification code, a location identification output device, and a date and clock signal output generator, said method comprising the steps of:
  a. determining movement of said data logging device;
  b. powering on said data logging device from a data logging power standby mode if in said power standby mode based on said step of determining movement of said data logging device;
  c. retrieving said unique identifier address datum, a position datum from said location identification device, and current date and time data from said date and clock signal generator;
  d. storing date and time data in a date and clock memory register;
  e. assembling said unique identifier address datum, a position datum from said location identification device, and current date and time data from said date and clock signal generator into data record from said step of retrieving;
  f. storing said data record in a memory in said data logging device;
  g. determining when said data and clock signal output equals the sum of a first specified period of time and said stored date and time data in said data and clock memory register;
  h. determining movement of the data logging device within a second specified period of time;
    1) repeating the steps c. to g. when step h. determines movement within said second specified period of time;
    2) repeating steps d. to g. when step h. determines no movement within said second specified period of time and when date/clock output is less than the sum of a third specified period of time and said stored clock register data;
    3) powering down said data logging device to standby power when step h. determines no movement within said second specified period of time and when date/clock output is equal to or greater than the sum of a third specified period of time and said stored clock register data.

35. The method for collecting data of claim 34, wherein said location identification output device comprises one of a global positioning system output device, a cellular telephone location system device, and an accelerometer, or inertial positioning device.

36. A method of collecting accountability data for a moveable object, said method of collecting comprising the steps of:
  determining the presence of an electronic identification and data logging device;
  querying said electronic identification and data logging device to output a unique identification code;
  receiving said output unique identification code;
  comparing said received unique identification code with information related to said received unique identification code in a local database;
  querying, based on said step of comparing, said electronic identification and data logging device to transmit stored data comprising assembled information of said unique identification code, location coordinate data, and corresponding date and time data;
  receiving said stored data comprising assembled information of said unique identification code, location coordinate data, and corresponding date and time data from said electronic identification and data logging device based on the previous step of querying;
  capturing a digital image of a moveable object including a representation of at least one condition, wherein said at least one condition comprises one of a visible indication of distinguishing characteristics of said moveable object, a visible licensing indicator of said moveable object, and a graphical representation on said moveable object;
  displaying at a display device said representation of at least one condition of said moveable object from said step of capturing and a verification query based on said step of comparing;
  receiving input based on said step of displaying;
  comparing said received input with related data stored in said local database;
  assembling a data record comprising information contained in said unique identification code, said received stored data comprising assembled information of said unique identification code, location coordinate data, and corresponding date and time data, said captured image of said moveable object including a representation of at least one condition, and said received input, based on said step of comparing;
  storing said assembled data record in a local database; and
  transmitting said stored data record to a remote database.

37. The moveable object accountability system of claim 36, wherein said electronic identification and data logging device further comprises:
- a unique identification code specific only to said apparatus;
- a date and clock signal generator for outputting current date and clock data;
- a location identification device for determining the geographic location of said apparatus and outputting corresponding location data, said location device comprises one of a global positioning system output device, a cellular telephone location system device, and an accelerometer or inertial positioning device;
- a motion detection sensor for detecting when the apparatus is in motion;
- a central processing sub-system for data logging activated when said motion detection sensor detects motion, said data logging function comprises the assembling of data from said unique identification code, said date and clock data, and said location data at predetermined period time intervals;
- a memory for storing assembled data from said central processing sub-system; and
- a transmitter and receiver for transmitting and receiving data to and from said apparatus, said data comprises at least one of said unique identification code, and said stored assembled data.

38. The moveable object accountability system of claim 36, wherein said electronic identification and data logging device comprises a radio frequency identification device.

39. The moveable object accountability system of claim 38, wherein said unique identification code and said transmitter and receiver comprises a radio frequency identification device.

40. The moveable accountability system of claim 36, further comprising an output device for outputting information related to said unique identification code.

41. The moveable accountability system of claim 40, wherein said output device comprises a coupon printer device for printing coupons related to said unique identification code.

42. A moveable object accountability system for monitoring the status of at least one condition of a moveable object, wherein said at least one condition comprises one of a visible indication of distinguishing characteristics of said moveable object, a visible licensing indicator of said moveable object, and a graphical representation on said moveable object, said moveable accountability system comprising:
- an electronic identification and data logging device mounted on said moveable object, wherein said electronic identification and data logging device has a unique identification code and stored data comprising assembled information of said unique identification code, location coordinate data, and corresponding date and time data, said electronic identification and data logging device having a transmitter for transmitting a signal containing information of said unique identification code and said stored data;
- an electronic signal transmission and reception device for initiating communication with said electronic identification and data logging device and for receiving said unique identification code and said stored data from said electronic identification and data logging device mounted on said moveable object;
- a local database having stored information related to said unique identification code, said moveable object and said at least one condition of said moveable object;
- a camera for capturing a first image of said moveable object, wherein said first image includes a representation of said at least one condition of said moveable object;
- a display device for displaying graphical information contained in said first image, and displaying a query or information including or related to said unique identification code;
- an input device for inputting data related to said moveable object or responses to said query regarding information displayed at said display device;
- a data processing sub-system coupled to said electronic signal transmission and reception device, said local database, said camera, said display device, and said input device, said data processing sub-system for comparing said signal containing information of said unique identification code with related information in said local database, and for displaying, at said display device, graphical information contained in said first image and a query to validate information related to said moveable object and said unique identification code;
- means, within said data processing sub-system for compiling information received from said electronic signal transmission and reception device, from said camera, and from said input device into a data record;
- a memory within said data processing sub-system for storing said data record;
- a remote central processing data system having a central storage database;
- a communication link between said local database and said remote central data processing system for transmitting information between said remote central data processing system and said local database; and
- means for processing said at least one stored data record at said remote central processing data system.

43. A moveable object accountability system for monitoring the status of at least one condition of a moveable object, wherein said at least one condition comprises one of a visible indication of distinguishing characteristics of said moveable object, a visible licensing indicator of said moveable object, and a graphical representation on said moveable object, said moveable accountability system comprising:
- an electronic identification and data transmission device mounted on said moveable object, wherein said electronic identification and data transmission device has a transmitter for transmitting a unique identification code, and for transmitting corresponding data comprising assembled information of said unique identification code, location coordinate data, and corresponding date and time data to a remote central processing data system having a central storage database;
- an electronic signal transmission and reception device for initiating communication with said electronic identification and data transmission device and for receiving said unique identification code from said electronic identification and data transmission device mounted on said moveable object;
- a local database having stored information related to said unique identification code, said moveable object and said at least one condition of said moveable object;
- a camera for capturing a first image of said moveable object, wherein said first image includes a representation of said at least one condition of said moveable object;

a display device for displaying graphical information contained in said first image, and displaying a query or information including or related to said unique identification code;

an input device for inputting data related to said moveable object or responses to said query regarding information displayed at said display device;

a data processing sub-system coupled to said electronic signal transmission and reception device, said local database, said camera, said display device and said input device, said data processing sub-system for comparing said signal containing information of said unique identification code with related information in said local database, and for displaying, at said display device, graphical information contained in said first image and a query to validate information related to said moveable object and said unique identification code;

means, within said data processing sub-system for compiling information received from said electronic signal transmission and reception device, from said camera, and from said input device into a data record;

a memory location within said local database of said data processing sub-system for storing said data record;

a communication link between said local database and said remote central data processing system for transmitting information between said remote central data processing system and said local database; and means for correlating said at least one stored data record at said remote central processing data system to said transmitted corresponding data comprising said assembled information of said unique identification code, location coordinate data, and corresponding date and time data stored at a previous time in said remote central data processing system; and means for processing said at least one stored data record and said transmitted corresponding data.

44. The moveable object accountability system of claim 43, wherein said electronic identification and data transmission device comprises:

a unique identification code specific only to said apparatus;

a date and clock signal generator for outputting current date and clock data;

a location identification device for determining the geographic location of said apparatus and outputting corresponding location data, said location identification device comprises one of a global positioning system output device, a cellular telephone location system device, and an accelerometer or inertial positioning device;

a motion detection sensor for detecting when the apparatus is in motion;

a central processor sub-system for data retrieval and transmission activated when said motion detection sensor detects motion, said data retrieval and transmission function comprises the assembling of data from said unique identification code, said date and clock data, and said location data at predetermined period time intervals, and for subsequent transmission of said assembled data to a remote location;

a memory for storing assembled data from said central processor sub-system; and a transmitter and receiver for transmitting and receiving data to and from said apparatus, said data comprises at least one of said unique identification code and said assembled data.

45. The moveable object accountability system of claim 43, wherein said electronic identification and data transmission device comprises a radio frequency identification device.

46. The moveable object accountability system of claim 45, wherein said unique identification code and said transmitter and receiver comprises a radio frequency identification device.

47. The moveable accountability system of claim 43, further comprising an output device for outputting information related to said unique identification code.

48. The moveable accountability system of claim 47, wherein said output device comprises a coupon printer device for printing coupons related to said unique identification code.

* * * * *